F. R. WILLSON.
SPRING VEHICLE WHEEL.
APPLICATION FILED FEB. 26, 1915.
1,159,308.
Patented Nov. 2, 1915.
2 SHEETS—SHEET 1.
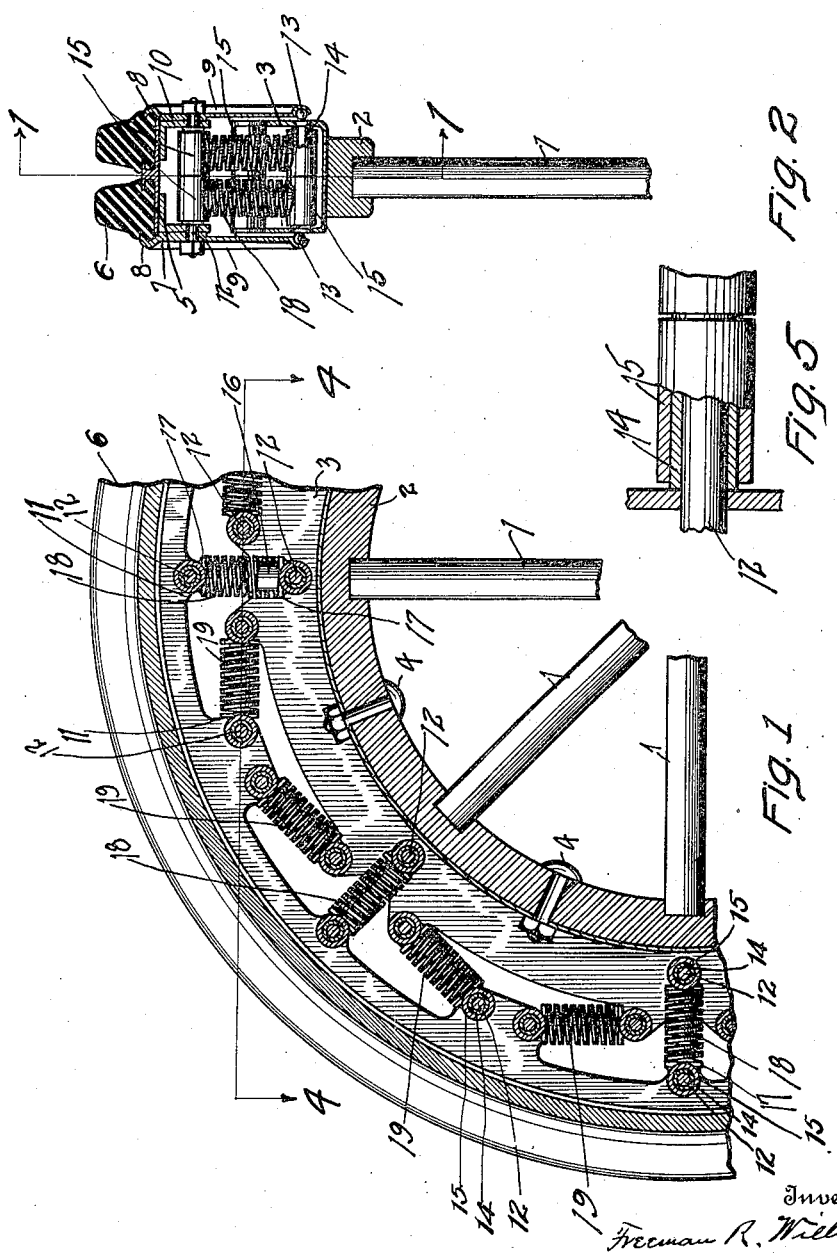
Witnesses
J. C. Merkle
A. L. Phelps
Inventor
Freeman R. Willson
By
C. C. Shepherd
Attorney

F. R. WILLSON.
SPRING VEHICLE WHEEL.
APPLICATION FILED FEB. 26, 1915.

1,159,308.

Patented Nov. 2, 1915.
2 SHEETS—SHEET 2.

Witnesses
J. C. Merkle
A. L. Phelps

Inventor
Freeman R. Willson

By
C. C. Shepherd
Attorney

UNITED STATES PATENT OFFICE.

FREEMAN R. WILLSON, OF WORTHINGTON, OHIO.

SPRING VEHICLE-WHEEL.

1,159,308.  Specification of Letters Patent.  Patented Nov. 2, 1915.

Application filed February 26, 1915.  Serial No. 10,849.

*To all whom it may concern:*

Be it known that I, FREEMAN R. WILLSON, a citizen of the United States, residing at Worthington, in the county of Franklin and State of Ohio, have invented certain new and useful Improvements in Spring Vehicle-Wheels, of which the following is a specification.

My invention relates to spring vehicle wheels and contemplates such an arrangement of springs between the spoke and tread portions as will permit an efficient up and down cushioning movement as well as a slight rotative movement to the tread of the wheel to take care of shocks such as may be caused by too rapid starting or the like.

The main object of my invention resides in providing an arrangement of springs freely movable so as not to set up any torsional or shearing strains while the wheel is functioning. In carrying forth this idea, I have provided a plurality of springs, these springs being each pivotally mounted at their opposite ends to thereby permit the desired degree of swing.

Figure 3:
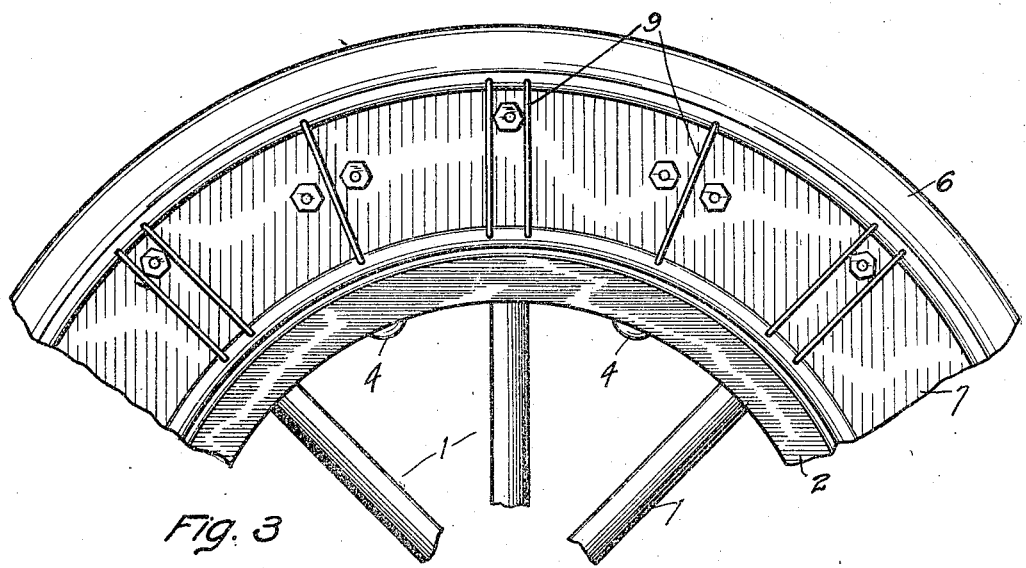
Figure 4:
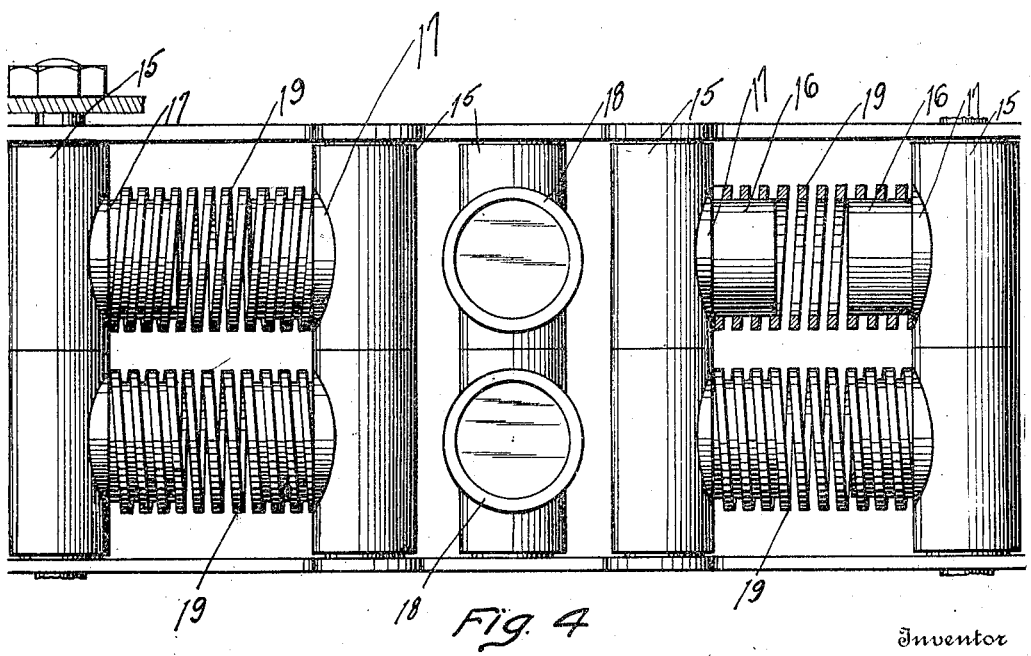

The preferred embodiment of my invention is shown in the accompanying sheets of drawings, in which similar characters of reference designate corresponding parts, and in which:

Figure 1 is a circumferential section showing a portion of my wheel assembled, this section being indicated on line 1—1 of Fig. 2, Fig. 2 is a vertical transverse section of the structure shown in Fig. 1, Fig. 3 is a side elevational view of a portion of my assembled wheel, Fig. 4 is an enlarged sectional view as represented by line 4—4 of Fig. 1, with parts broken away, and Fig. 5 is an enlarged cross sectional view partly in elevation through one of the pivoted ends of the springs.

In the drawings, it will be noted that the wheel is of somewhat conventional construction, being provided with spokes 1 and felly 2, an annular channel shaped band 3 being suitably secured to this felly by means of bolts shown at 4. Encircling this spoke portion and somewhat larger than the same is a tread portion formed of an annular band 5 carrying the tires 6. These tires are held in clamped position upon the band 5 by means of circular side pieces 7 provided with clencher portions as shown at 8. These side pieces are also provided with a series of radially arranged reinforcing ribs such as are shown at 9 and the interior of the tread portion is reinforced by means of the annular angular members shown at 10. These reinforcing angles as well as the channel shaped member 3 are each provided with radially projecting ears such as are indicated at 11, these ears being pierced to receive the cross pins 12. A portion of these cross pins, those carried by and extending transversely across the spoke portion are preferably in the nature of rivets provided with countersunk heads, while the remainder or those carried by and passing transversely across the tread portion are in the nature of bolts. These bolts also serve the purpose of holding the side pieces 7 in clamping engagement with the rubber tire 6 and inasmuch as the arrangement of these bolts is somewhat staggered as is clearly indicated in Fig. 3, they also serve to hold the inner edge of the side pieces 7 in engagement with the U-shaped channel member 3, these inner edges being provided with suitable packing as is indicated at 13 to exclude all dust and the like from the cushioning parts of the wheel. Each of these pins is provided with a sleeve 14, these sleeves being of such length to engage both inside walls of the channel member 3 and the inside walls of the reinforcing angles 10. By reference to Fig. 2, it will be noted that these reinforcing angles also serve the purpose of fillers to make the distance between the inside walls of the channel member 3 equal to the distance between the inside walls of the angle members 10. Mounted in a manner to freely rotate about each one of these sleeves is a pivot member designated 15, each pivot member being provided with a pair of outstanding lugs 16 and a shelf 17, the lugs serving the purpose of centering the springs by entrance in their ends, while the shelves 17 serve as abutments for the ends of these springs.

In carrying forth my invention I find it desirable to place each of the springs under compression, this compression approximately equaling the amount of movement of the wheel in its cushioning action. The springs designated 18 are preferably arranged radially, by which I mean that they radiate from the spoke portion toward the tread portion while those designated 19 are arranged to extend obliquely to those shown at 18. Each spring end is pivotally attached to either the spoke or tread portion and consequently the cushioning movement of the wheel causes these spring ends to pivot about their mounting. As shown in Fig. 1, the spoke portion is arranged concentrically with the tread portion, but it is understood that in actual use this wheel must sustain a portion of the weight of the vehicle and, therefore, certain of the springs will be under greater compression than is normal, while others will be further extended than is normal. Under these conditions, the springs 19 shown on the upper portion of the wheel, will assume a slightly inclined position, as will the springs 18 at the sides of the wheels.

For the purpose of clearly setting forth the manner in which the wheel functions, it is necessary to consider the clusters in horizontal and vertical alinement with the hub only. Upon striking an object, the spring 18 of the lower cluster is compressed to take up the shock direct, while the one on the upper half of the wheel is allowed to expand. However, the compression of the spring on the upper half of the wheel gradually weakens as it expands, while the compression of the spring 18 on the lower half of the wheel gradually increases as it is compressed. The upper springs 19 of the clusters in horizontal alinement with the hub will act as has been outlined for the springs 18 on the upper half of the wheel while the lower springs 19 of the same clusters will act as outlined for the springs 18 on the lower half of the wheel and consequently the springs 18 on the lower half of the wheel and the springs 19 located at each side of the wheel, absorb the same amount of the shock. The action of the clusters of springs intermediate the two clusters already referred to is of a compound nature, those designated 18 on the lower half of the wheel and those designated 19 nearest the bottom of the wheel each being further compressed when the wheel strikes an object while the action of those on the upper half of the wheel is exactly the reverse.

What I claim, is:

1. A spring vehicle wheel comprising a hub and spoke portion, a tread portion, and a plurality of sets of springs symmetrically arranged and interposed between said spoke and tread portions, each set comprising a pair of radially extending springs arranged side by side and equally spaced on opposite sides of the center plane of the wheel, and a pair of similarly located springs on each side of and extending obliquely to said first named springs, the obliquely arranged springs on opposite sides of said radial springs being normally in longitudinal alinement and all of said oblique springs on the same side of said radial springs extending in parallel directions, one end of all of the springs of each set being pivotally attached to said hub portion and the other spring ends being pivotally attached to said tread portion.

2. A spring vehicle wheel comprising a hub and spoke portion, a tread portion, and a plurality of sets of springs symmetrically arranged and interposed between said spoke and tread portions, each set comprising a pair of radially extending springs arranged side by side and equally spaced on opposite sides of the center plane of the wheel, and a pair of similarly located springs on each side and extending obliquely to said first named springs, the obliquely arranged springs on opposite sides of said radial springs being normally in longitudinal alinement and all of said oblique springs on the same side of said radial springs extending in parallel directions, cross pins for each end of each pair of springs, certain of which extend transversely across said spoke portion and the remainder of which extend transversely across said tread portion, a sleeve on each of said pins, a pivot member pivotally mounted on each sleeve, said members being shorter than said sleeves, and centering studs on said members arranged to seat themselves in the spring ends.

In testimony whereof I affix my signature in presence of two witnesses.

FREEMAN R. WILLSON.

Witnesses:
  WALTER E. L. BOCK,
  A. L. PHELPS.